US006874739B1

(12) United States Patent
Gregory

(10) Patent No.: US 6,874,739 B1
(45) Date of Patent: Apr. 5, 2005

(54) CABINET POSITIONING SYSTEM

(75) Inventor: Scott B. Gregory, Peoria, AZ (US)

(73) Assignee: Gregory's Enterprises Inc., Glendale, AZ (US)

(*) Notice: Subject to any disclaimer, the term of this patent is extended or adjusted under 35 U.S.C. 154(b) by 0 days.

(21) Appl. No.: 10/128,061

(22) Filed: Apr. 23, 2002

Related U.S. Application Data

(60) Provisional application No. 60/285,735, filed on Apr. 23, 2001.

(51) Int. Cl.$^7$ ......................... F16M 11/24; E04H 12/34

(52) U.S. Cl. .............................. 248/188.4; 248/354.4; 52/123.1; 414/11; 269/289 R; 33/286

(58) Field of Search ............................ 248/188.4, 408, 248/354.1, 354.3, 354.4, 354.5, 354.6, 288.51; 414/11; 52/123.1, 122.1, 125; 312/245; 269/289 R; 33/333, 285, 286, DIG. 21

(56) References Cited

U.S. PATENT DOCUMENTS

| | | | | |
|---|---|---|---|---|
| 1,708,761 | A * | 4/1929 | Horbath | 248/185.1 |
| 1,725,329 | A * | 8/1929 | Blandford | 414/11 |
| 2,164,609 | A * | 7/1939 | Cusick | 248/408 |
| 2,504,291 | A * | 4/1950 | Alderfer | 254/98 |
| 3,857,639 | A * | 12/1974 | Mason | 356/400 |
| 3,930,645 | A * | 1/1976 | Anderson | 269/289 R |
| 4,027,802 | A * | 6/1977 | Reynolds | 414/11 |
| 4,733,844 | A * | 3/1988 | Molloy | 248/354.1 |
| 5,169,219 | A * | 12/1992 | Obbink | 312/245 |
| 5,322,403 | A * | 6/1994 | Herde | 414/11 |
| 5,587,051 | A * | 12/1996 | Ostermayer et al. | 162/198 |
| 5,713,135 | A * | 2/1998 | Acopulos | 33/451 |
| 5,839,239 | A * | 11/1998 | Jang | 52/123.1 |
| 5,842,282 | A * | 12/1998 | Ting | 33/227 |
| 5,864,956 | A * | 2/1999 | Dong | 33/227 |
| 5,930,904 | A * | 8/1999 | Mualem | 33/1 Q |
| 6,052,911 | A * | 4/2000 | Davis | 33/286 |
| 6,374,507 | B1 * | 4/2002 | Lehto | 33/645 |
| 6,470,579 | B2 * | 10/2002 | Allen | 33/286 |
| 6,505,803 | B1 * | 1/2003 | Hernandez | 248/354.5 |
| 6,510,615 | B1 * | 1/2003 | Budd | 33/286 |
| 6,532,676 | B2 * | 3/2003 | Cunningham | 33/286 |
| 6,598,304 | B2 * | 7/2003 | Akers | 33/286 |
| 6,628,378 | B1 * | 9/2003 | Marangoni et al. | 356/150 |

* cited by examiner

*Primary Examiner*—Anita M. King
(74) *Attorney, Agent, or Firm*—Parsons&Goltry; Robert A. Parsons; Michael W. Goltry

(57) ABSTRACT

A positioning system includes a first lift, a second lift, and a leveling system. Each lift includes a base, an adjustment element including a tubular body having a first end coupled to the base and a second end, a drive nut carried at the second end, and a drive screw carried within the body and having an end extending from the body through the drive nut, the drive screw movable between a retracted position and an extended position by rotation of the drive nut, and a support plate coupled to the end of the drive screw. An extension element is couplable between the base and the adjustable element. The leveling system includes a laser element coupled to the support plate of the first lift and a metering element coupled to the support plate of the second lift.

13 Claims, 4 Drawing Sheets

FIG. 12
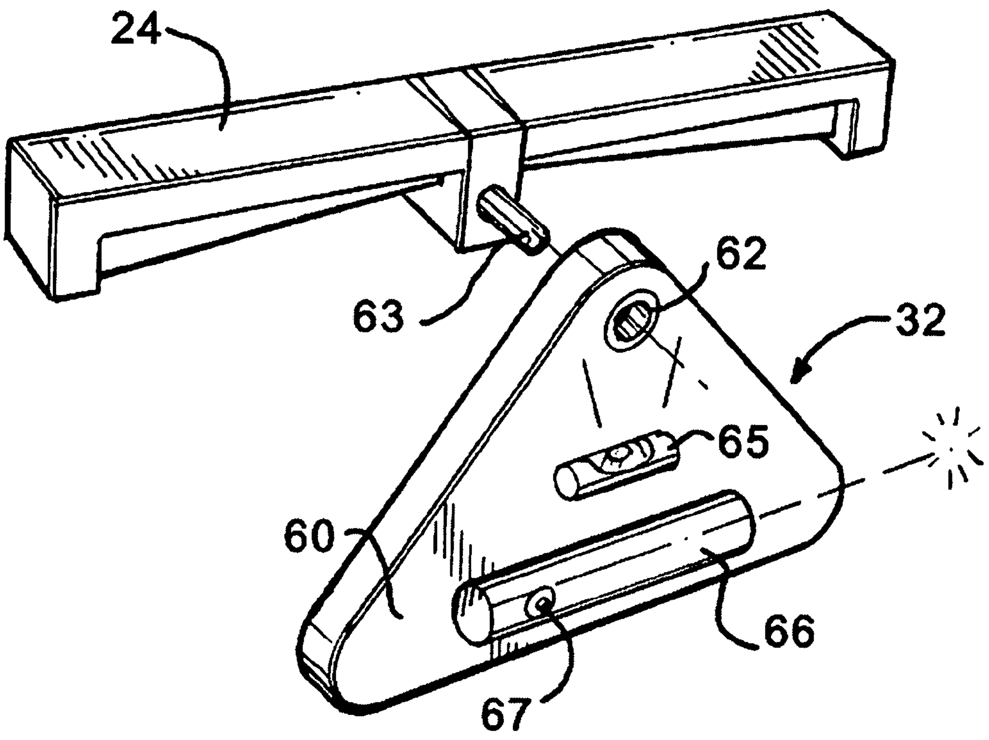
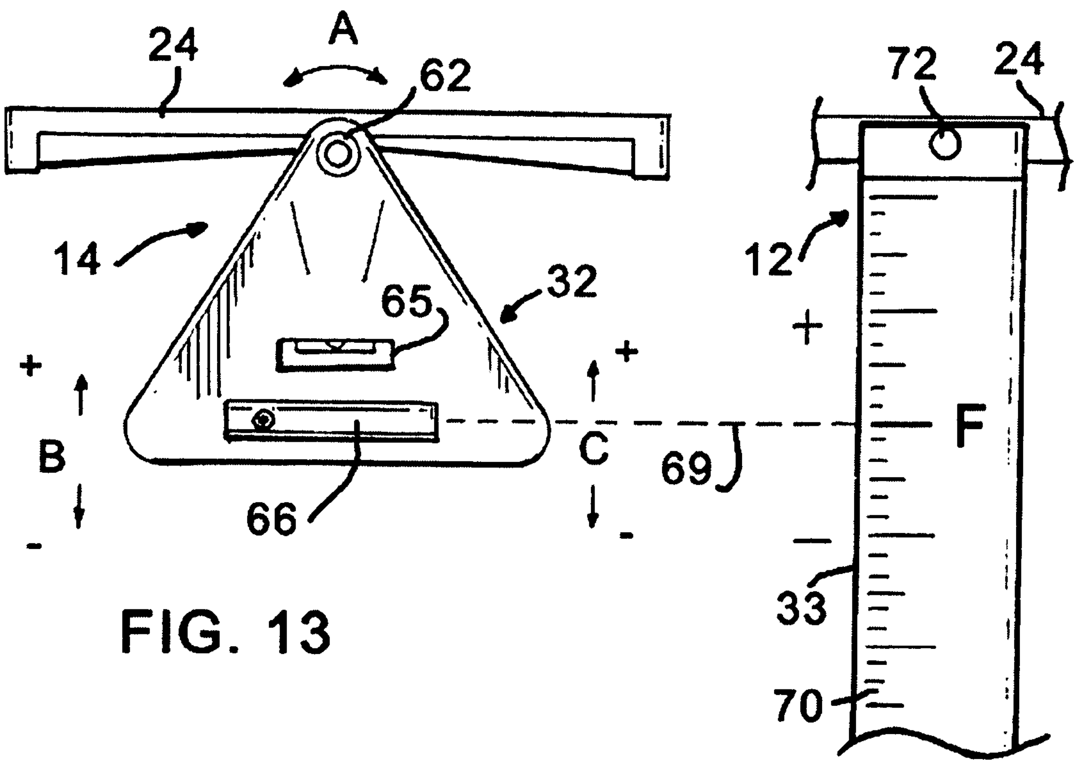
FIG. 13

CABINET POSITIONING SYSTEM

CROSS-REFERENCE TO RELATED APPLICATION

This application claims the benefit of U.S. Provisional Application Ser. No. 60/285,735, filed 23 Apr. 2001.

FIELD OF THE INVENTION

This invention relates to lifting devices.

More particularly, the present invention relates to devices for lifting and position objects.

BACKGROUND OF THE INVENTION

Various projects, such as the installation of cabinetry or drywall, require the lifting and positioning of large and unwieldy objects. For example, upper cabinets must be held in position, leveled, and then fastened in place. This often takes a coupled of workers using levels. Thus, cost is increased due to the necessity of having more than one worker. Additionally, lifting, holding and leveling an object such as a cabinet or a large piece of drywall can be difficult and physically fatiguing.

Typically, when installing objects, a worker employs ladders boxes, or many other objects that happen to be handy, to prop the drywall of cabinet in place. While somewhat effective, these make shift props can be unstable, are difficult to use, make leveling of the object very uncertain and are often employed simply to allow the workers holding the objects to have a rest.

It would be highly advantageous, therefore, to remedy the foregoing and other deficiencies inherent in the prior art.

Accordingly, it is an object of the present invention to provide a new and improved device and system for positioning an object for installation.

Another object of the invention is to provide a cabinet positioning system which can be operated by a single worker.

And another object of the invention is to provide a cabinet positioning system which can be used to level a cabinet or other object being supported.

Still another object of the present invention is to provide a cabinet positioning system capable of adjustment in large increments and infinite small adjustments.

SUMMARY OF THE INVENTION

Briefly, to achieve the desired objects of the instant invention in accordance with a preferred embodiment thereof, provided is a positioning system including a first lift and a second lift. Each lift includes a base, an adjustment element including a tubular body having a first end coupled to the base and a second end, a drive nut carried at the second end, and a drive screw carried within the body and having an end extending from the body through the drive nut. A support plate is coupled to the end of the drive screw. The drive screw is movable between a retracted position and an extended position by rotation of the drive nut. A leveling system includes a laser element coupled to the support plate of the first lift and a metering element coupled to the support plate of the second lift.

In a specific aspect, an extension element can be coupled between the adjustment element and the base, the extension element having a first end received by the base, and a second end coupled to the first end of the tubular body. Additionally, the extension element can include telescoping tubular elements.

BRIEF DESCRIPTION OF THE DRAWINGS

Specific objects and advantages of the invention will become readily apparent to those skilled in the art from the following detailed description of a preferred embodiment thereof, taken in conjunction with the drawings in which:

FIG. 12 is an enlarged detailed view of the leveling mechanism illustrated diagrammatically in FIG. 1; and FIG. 13 is a schematic view illustrating the operation of the leveling system of FIG. 12.

DETAILED DESCRIPTION OF THE DRAWINGS

Figures 1, 2, 3, 4, 5:
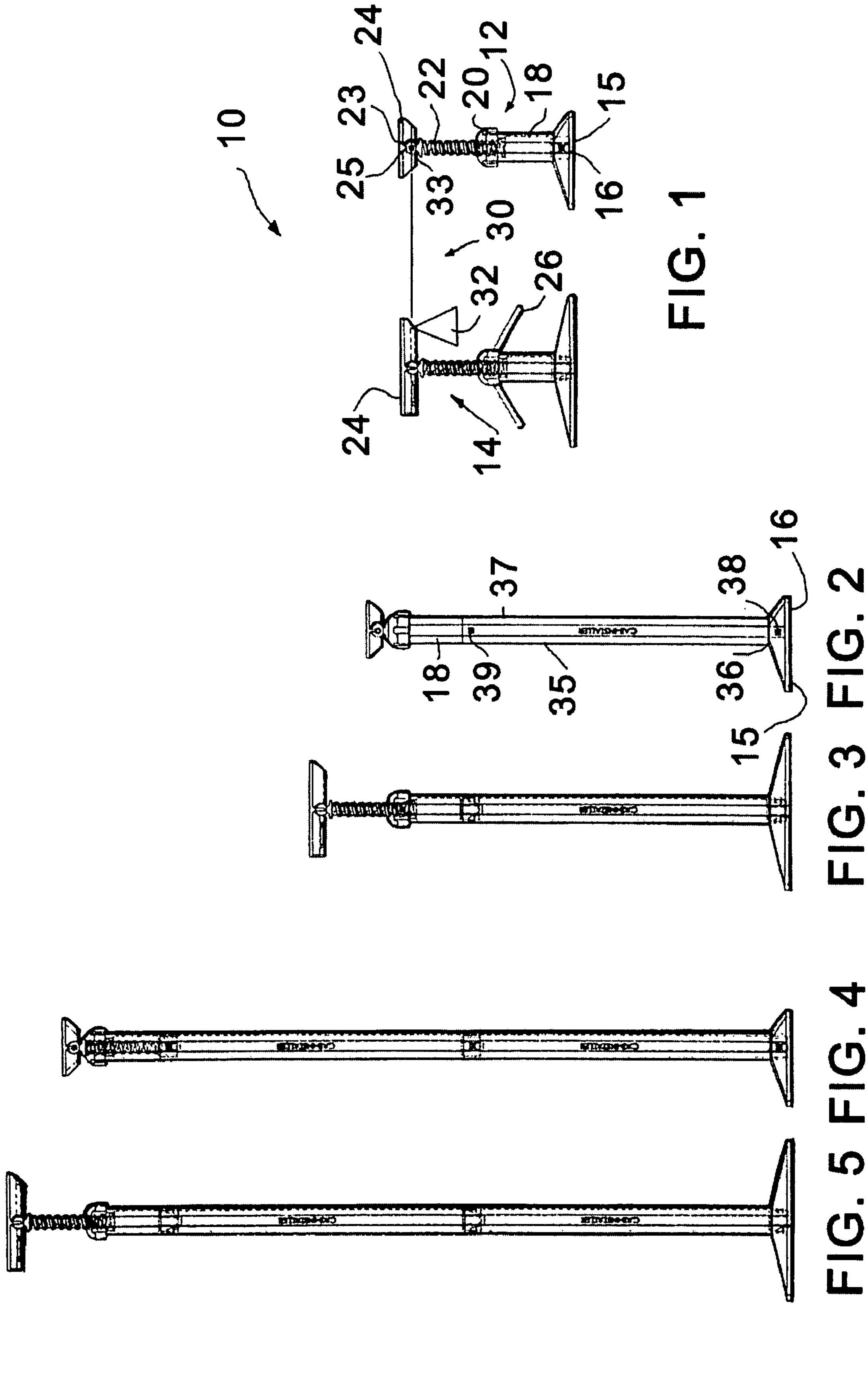
FIG. 1 is a view in side elevation of a cabinet positioning system including a pair of cabinet lifts in accordance with the present invention.
FIG. 2 is a view in side elevation of one of the pair of cabinet lifts of FIG. 1 with a single extension.
FIG. 3 is a view in side elevation of the cabinet lift of FIG. 2 in an extended configuration.
FIG. 4 is a view in side elevation of one of the pair of cabinet lifts of FIG. 1 with two extensions.
FIG. 5 is a view in side elevation of the cabinet lift of FIG. 4 in an extended configuration.

Turning now to the drawings in which like reference characters indicate corresponding elements throughout the several views, attention is directed to FIG. 1 which illustrates a cabinet positioning system generally designated 10. It should be noted that while the device is referred to as a cabinet positioning system, one skilled in the art will understand that this is a title of convenience and that cabinet can refer to substantially any object such as a sheet of drywall, etc. System 10 includes a cabinet lift 12 and a cabinet lift 14. While a pair of lifts is illustrated it will be understood that additional lifts can be employed. Lifts 12 and 14 are intended to include interchangeable components, and are substantially similar. Therefore, only one will be described in detail. Each lift 12 and 14 includes a support base 15 having a socket 16 for receiving the end of an elongated adjustment element 18.

Adjustment element 18 includes a drive nut 20 rotatably positioned proximate the upper end. A driven screw 22 is carried within element 18 and extends from the upper end into threaded engagement with nut 20. Screw 22 terminates in a ball 23 at the upper end thereof. A cabinet support plate 24 includes a socket 25 centrally positioned on a lower surface and in receipt of ball 23, which allows for universal movement of plate 24. Thus, rotary movement of drive nut 20 in one direction causes screw 22 to extend farther from the upper end of element 18 and rotary movement in the opposite direction draws screw 22 into element 18. Drive nut 22 can be rotated by hand or, as illustrated in conjunction with lift 14, outwardly projecting handles 26 can be easily attached to facilitate rotation.

Still referring to FIG. 1, a leveling system 30 is incorporated into lifts 12 and 14. System 30 includes a laser element 32 carried by support plate 24 of lift 14 and a laser receiving calibration element 33. A specific embodiment will be described below.

Figure 14:
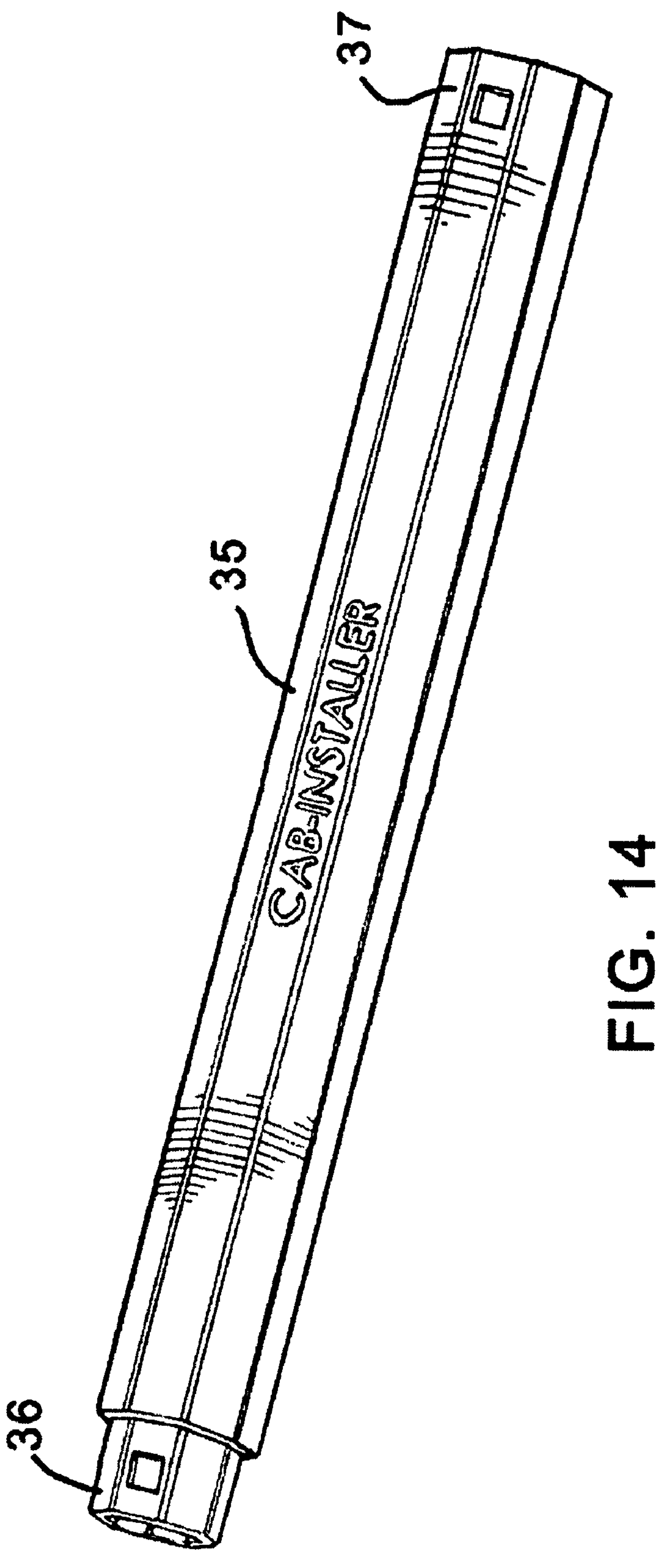
FIG. 14 is an enlarged isometric view of the extension used in FIG. 2.

Turning now to FIG. 2, lift 12 is illustrated with an extension 35 carried between base 15 and adjustment element 18. Extension 35 (as best seen by referring additionally to FIG. 14) is an elongated element with an end 36 received by socket 16 and an opposing end 37 in receipt of adjustment element 18. Extension 35 is held firmly in place by means of a locking mechanism (e.g. spring clips, bolts, pins, etc.), one of which extends through a transverse hole 38 through support base 15 and end 36 and a second transverse hole 39 which extends through end 37 and adjustment element 18. Extension 35 can be used to extend each cabinet lift 12 and 14 in large steps. Drive nut 20 and driven screw 22 are then used for smaller extensions to position a cabinet or other structure precisely in a desired location. Additional large steps can be provided by adding additional extensions 35, as illustrated in FIGS. 4 and 5.

Figures 6, 7, 8, 9, 10, 11:
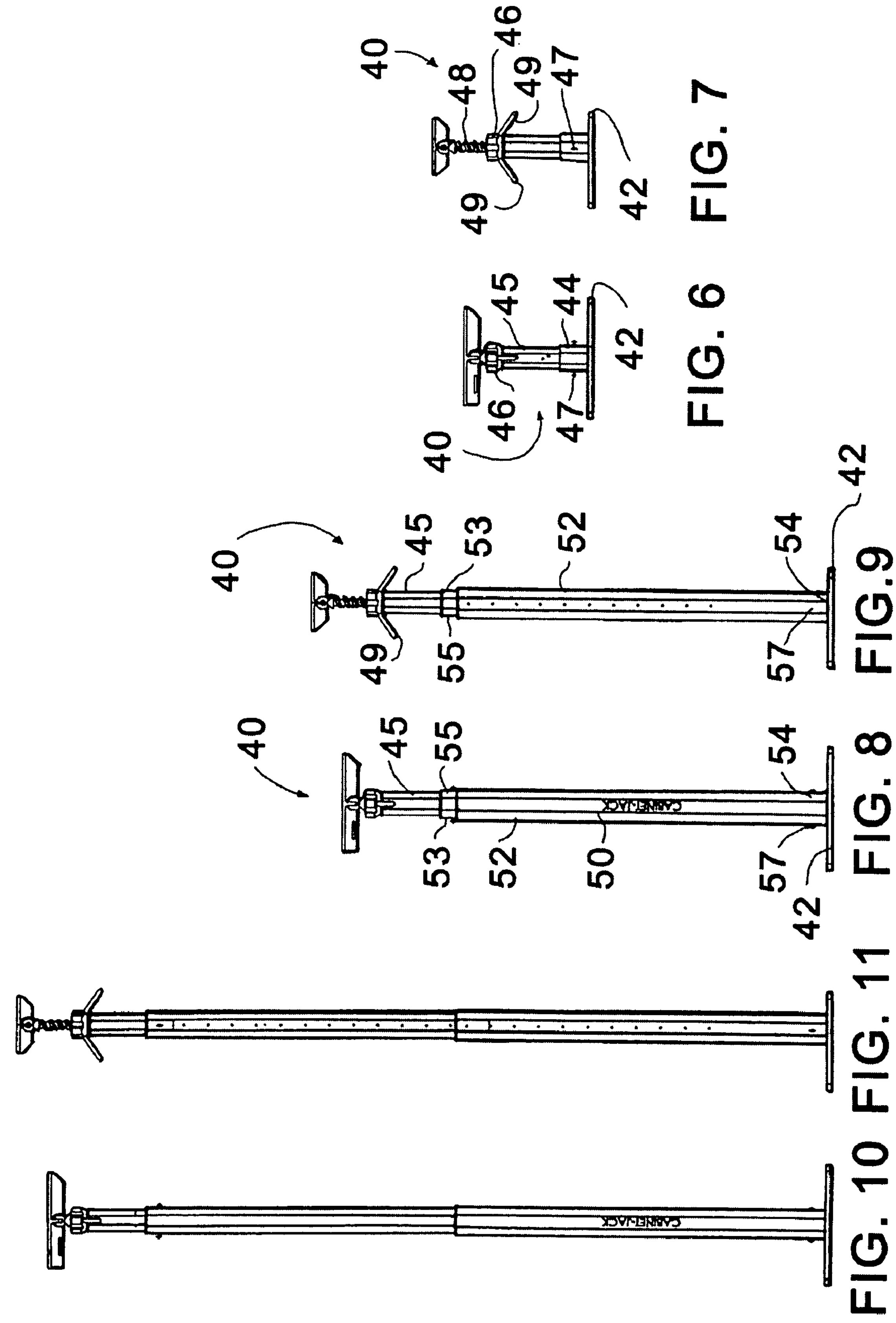
FIG. 6 is a view in side elevation of another embodiment a cabinet lift in accordance with the present invention.
FIG. 7 is a view in side elevation of the cabinet lift of FIG. 6 in an extended configuration.
FIG. 8 is a view in side elevation of the cabinet lift of FIG. 6 with a telescoping extension.
FIG. 9 is a view in side elevation of the cabinet lift of FIG. 8 in an extended configuration.
FIG. 10 is a view in side elevation of the cabinet lift of FIG. 8 in a telescoped configuration.
FIG. 11 is a view in side elevation of the cabinet lift of FIG. 10 in the telescoped and extended configuration.

Referring to FIG. 6, another embodiment of a cabinet lift, generally designated 40, is illustrated. Lift 40 includes a support base 42 having a coupling member 44 extending upwardly therefrom, for receiving therein the end of an elongated adjustment element 45. Element 45 is held firmly in place by means of a locking mechanism (e.g. spring clips, bolts, pins, etc.), one of which extends through a transverse hole 47 through coupling member 44 and a lower end of element 45. Element 45 will not be described in detail as it is essentially similar to adjustment element 18.

As with the previously described lifts, lift 40 with element 45 can be used to position an item such as a cabinet over a short distance. As seen in FIG. 7, element 45 includes a drive nut 46 and a driven screw 48. Thus, rotary movement of drive nut 46 in one direction causes screw 48 to extend farther from the upper end of element 45 and rotary movement in the opposite direction draws screw 48 into element 45. Drive nut 46 can be rotated by hand or, as illustrated in FIG. 7, outwardly projecting handles 49 can be easily attached to facilitate rotation.

Turning to FIG. 8, lift 40 is illustrated with a telescoping extension 50 carried between base 42 and adjustment element 45. Telescoping extension 50 is a telescoping pair of elongated elements 52 and 53. Elongated element 52 has an end 54 received over coupling member 44 (not visible) and an opposing end in telescoping receipt of element 53. Element 53 has an end 55 in receipt of the lower end of adjustment element 45. Telescoping extension 50 is held firmly in place over coupling member 44 by means of a locking mechanism (e.g. spring clips, bolts, pins, etc.), which extends through a transverse hole 57 through coupling member 44 and end 54.

Telescoping extension 50 can be used to extend cabinet lift 40 in incremental steps. Drive nut 46 and driven screw 48 are then used for smaller extensions (as illustrated in FIGS. 9 and 11) to position a cabinet or other structure precisely in a desired location. Additional incremental steps can be provided by telescoping expansion of telescoping extension 50, as illustrated in FIGS. 10 and 11.

Turning now to FIG. 12 an enlarged detailed view of laser element 32 of leveling system 30 (illustrated diagrammatically in FIG. 1) is illustrated. Laser element 32 includes a triangularly shaped mounting frame 60 having a pivotable mount 62 at an apex. In this specific embodiment mount 62 includes a high performance bearing mounted on the apex of frame 60 for receiving an extended end of a peg 63, which is affixed to support plate 24. A bubble level 65 is mounted on frame 60 in parallel with a laser unit 66. Laser unit 66 can be, for example, a self-contained battery operated unit including a switch 67 for activating and deactivating laser unit 66. Level 65 is used to indicate when laser unit 66 is pointed horizontally.

Thus, in operation, frame 60 is hung on peg 63 and laser unit 66 is turned on. With frame 60 hanging from peg 63, frame 60 is free to pivot to a level position with laser unit 66 directing a beam onto laser receiving calibration element 33. To ensure the proper orientation of laser unit 66 and frame 60, it is preferred that laser unit 66 is adjustably mounted on frame 60. By adjusting laser unit 66, such as by threading it further into or out of frame 60 (providing horizontal adjustment), frame 60 will hang level as measured by level 65. The laser beam, as illustrated by broken line 69, crosses the intervening space between lifts 14 and 12 and impinges upon laser receiving calibration element 33.

Calibration element 33 includes indicia indicating the relative position of support plates 24 of lifts 12 and 14. Calibration element 33 includes a mounting frame 70 having a pivotable mount 72 adjacent an upper end. In this specific embodiment mount 72 includes a high performance bearing for receiving an extended end of peg 63, which is affixed to support plate 24 of lift 12. It is intended that all components are interchangeable, therefore laser element 32 and calibration element 33 can be interchanged between any lifts employed. The indicia on mounting frame 70, in cooperation with laser beam 69, indicates the direction for adjusting lift 12 (or lift 15) to achieve a level cabinet or other item.

While lift system 10 is preferably employed to position a cabinet, other items such as drywall etc. can be positioned. When drywall is supported, it may be desirable to fit horizontal extensions onto support plate 24 to provide a wider area of support. Additionally, horizontal legs can be added to base 15 to provide a more stable base to support larger items.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A positioning system comprising:

a first lift and a second lift each including a base, an adjustment element including a tubular body having a first end coupled to the base and a second end, a drive nut carried at the second end, and a drive screw carried within the body and having an end extending upwardly from the body through the drive nut, the drive screw movable between a retracted position and an extended position by rotation of the drive nut, and a support plate coupled to the end of the drive screw; and a leveling system including a mounting frame with a laser element affixed thereto, the mounting frame being pivotally coupled to the support plate of the first lift so as to freely pivot and maintain the laser element level and a metering element coupled to the support plate of the second lift.

2. The positioning system as claimed in claim 1 wherein each adjustment element is coupled to each base by an extension element having a first end received by the base, and a second end coupled to the first end of the tubular body.

3. The positioning system as claimed in claim 2 wherein the extension element includes telescoping tubular elements.

4. The positioning system as claimed in claim 1 wherein the end of each drive screw terminates is a ball received by a socket in the support plate, forming a universal joint.

5. The positioning system as claimed in claim 1 wherein the mounting frame includes a generally triangular mounting frame having an apex and a base, the frame carrying the laser element and pivotally mounted at the apex to the support plate of the first lift to freely pivot so the base remains level.

6. The positioning system as claimed in claim 1 wherein the metering element is pivotally carried by the support plate of the second lift to freely pivot so as to hang generally vertically and receive a laser beam from the laser element.

7. The positioning system as claimed in claim 1 wherein the mounting frame further includes a bubble level to determine that the laser element is level.

8. A positioning system comprising:

a first lift and a second lift each including a base, an adjustment element including a tubular body having a first end coupled to the base and a second end, a drive nut carried at the second end, and a drive screw carried within the body and having an end extending upwardly from the body through the drive nut, the drive screw movable between a retracted position and an extended position by rotation of the drive nut, and a support plate coupled to the end of the drive screw;

an extension element couplable between the base and the adjustable element, the extension element having a first end receivable by the base, and a second end attachable to the first end of the tubular body; and a leveling system including a mounting frame with a laser element affixed thereto, the mounting frame being pivotally coupled to the support plate of the first lift so as to freely pivot and maintain the laser element level and a metering element coupled to the support plate of the second lift.

9. The positioning system as claimed in claim 8 wherein the extension element includes telescoping tubular elements.

10. The positioning system as claimed in claim 8 wherein the end of each drive screw terminates is a ball received by a socket in the support plate, forming a universal joint.

11. The positioning system as claimed in claim 8 wherein the mounting frame includes a generally triangular mounting frame having an apex and a base, the frame carrying the laser element and pivotally mounted at the apex to the support plate of the first lift to freely pivot so the base remains level.

12. The positioning system as claimed in claim 8 wherein the metering element is pivotally carried by the support plate of the second lift to freely pivot so as to hang generally vertically and receive a laser beam from the laser element.

13. The positioning system as claimed in claim 8 wherein the mounting frame further includes a bubble level to determine that the laser element is level.

* * * * *